R. G. A. MAUCLAIRE.
MOTOR ATTACHMENT FOR CYCLES.
APPLICATION FILED JUNE 17, 1914.

1,212,982.

Patented Jan. 16, 1917.
2 SHEETS—SHEET 1.

R. G. A. MAUCLAIRE.
MOTOR ATTACHMENT FOR CYCLES.
APPLICATION FILED JUNE 17, 1914.

1,212,982.

Patented Jan. 16, 1917.
2 SHEETS—SHEET 2.

Witnesses:
M. J. Whittaker
G. M. Hulet

Inventor:
R. G. A. Mauclaire
per H. W. Waghorn
Attorney.

UNITED STATES PATENT OFFICE.

RAYMOND GEORGES AIMÉ MAUCLAIRE, OF ASNIÈRES, FRANCE.

MOTOR ATTACHMENT FOR CYCLES.

1,212,982.  Specification of Letters Patent.  Patented Jan. 16, 1917.

Application filed June 17, 1914. Serial No. 845,528.

*To all whom it may concern:*

Be it known that I, RAYMOND GEORGES AIMÉ MAUCLAIRE, of 12 Avenue d'Argenteuil, Asnières, Seine, Republic of France, have invented an Improved Motor Attachment for Cycles, of which the following is a full, clear, and exact description.

The present invention relates to a removable motor unit, capable of being instantaneously adapted to a bicycle or other cycle.

The invention relates more particularly to a motor unit comprising a pulley actuated by the motor and adapted to be brought into contact with or moved away from the tire of a wheel of the cycle so as to drive this wheel by friction when desired.

The object of the invention is to improve the means for supporting, adjusting and operating the movable parts of such a motor unit.

A further object is to provide a light and simple structure capable of being fitted easily and readily to a cycle of any usual type.

The annexed drawing, given as an example only, represents one method of carrying the invention into effect.

Figure 1:
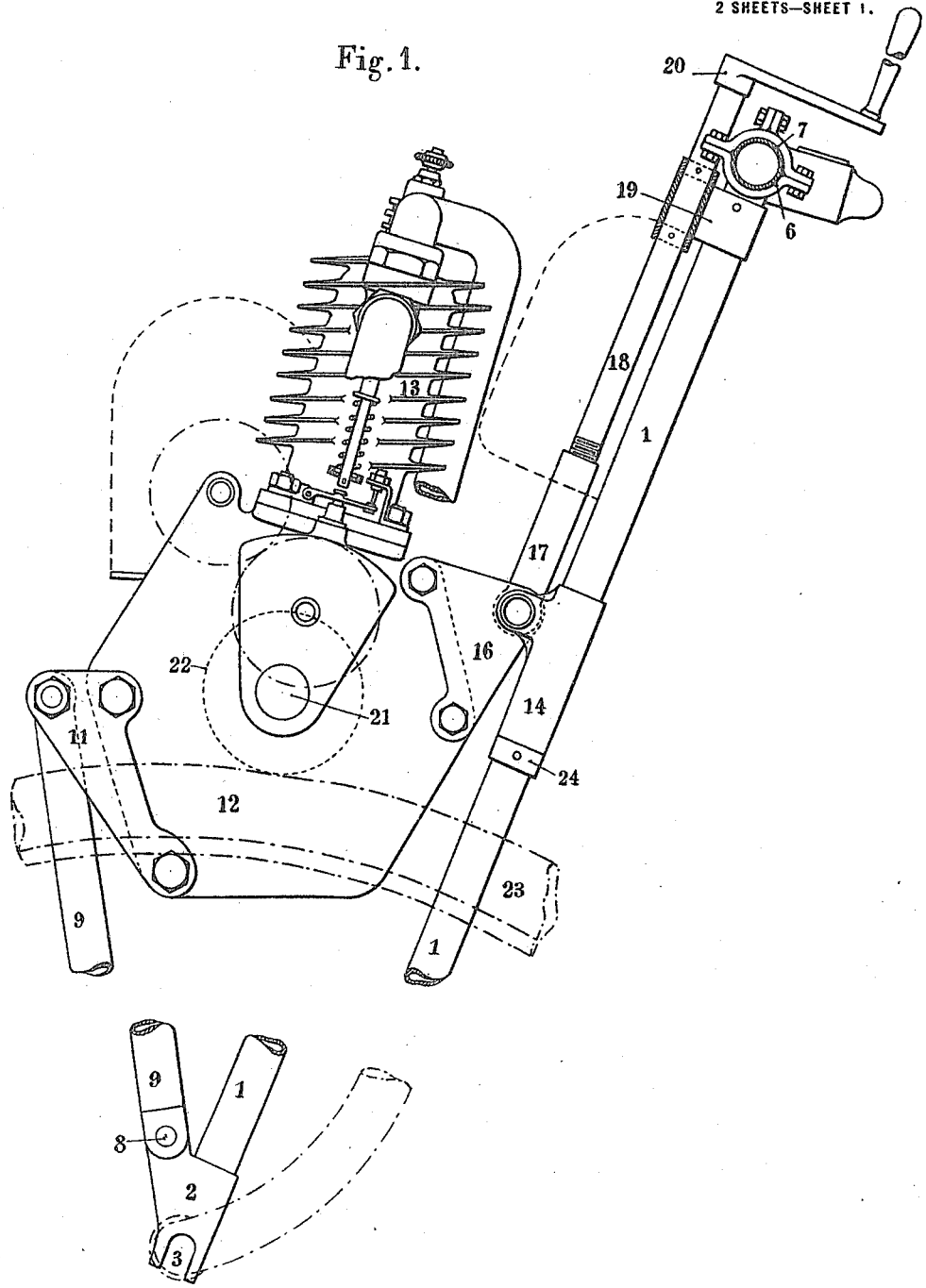
Figure 2:
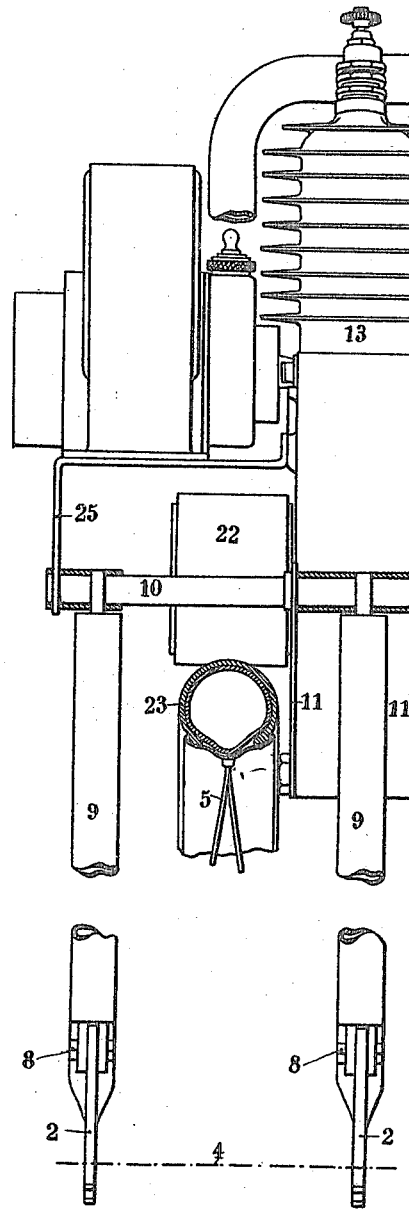
Figure 3:
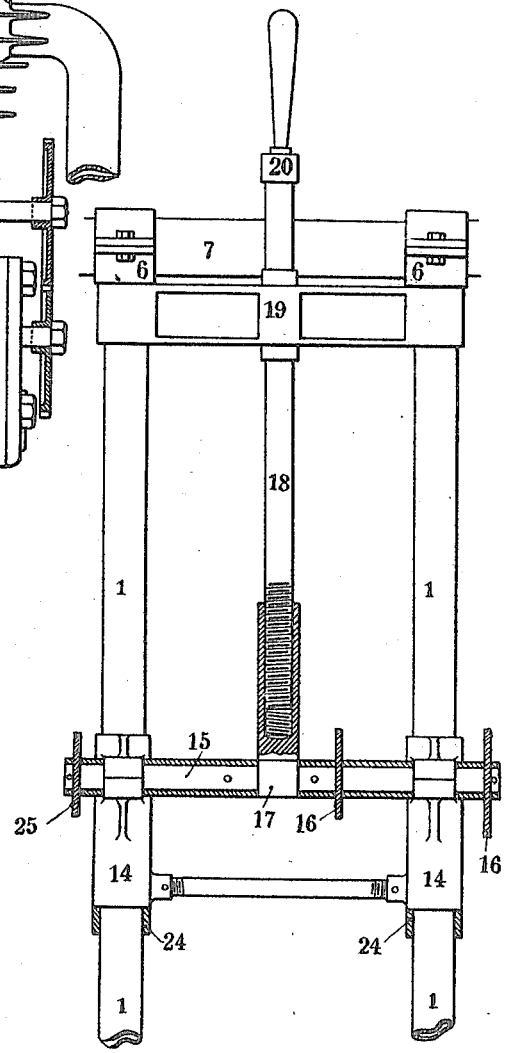

In this drawing: Figure 1 is an elevation showing the motor unit fitted to the front part of a bicycle. Fig. 2 is a corresponding front view of the same. Fig. 3 is a front view, the motor and its casing being supposed to be removed.

As is seen by this drawing, the new arrangement comprises two stays 1, intended to serve at the same time as supports and slides for the motor unit, these stays terminate at their lower part by a lug 2, having a notch 3, and intended to be fixed on the axle, indicated by dotted line 4, of the wheel 5, and at their upper part by a clamp 6, intended to be fixed to the handle bar 7 of the machine. As is seen, these stays act to reinforce the fork of the machine to which the motor unit is attached. On the lugs 2 are mounted respectively two axles 8, around which pivot the supports 9. The supports 9 are united at their upper part by a cross bar 10 (Fig. 2), intended to maintain their distance apart and to support the brackets 11, which can turn freely around the said cross bar 10, and which are otherwise fixed on the crank casing 12 of the motor 13.

On the stays 1 can be moved two slides formed, in the example represented, by two tubes 14, also connected together by a cross bar 15, on which are mounted, in such manner as to be capable of turning around it, two other brackets 16, fixed to the casing 12, similar to the brackets 11. To this cross bar 15, is fixed a lifting nut 17 (Fig. 3), into which a screw threaded shaft 18 can be screwed. This shaft 18 can turn freely in a bearing 19, forming a support fixed to the stays 1. The shaft 18 carries at its upper part a crank handle 20 keyed thereon. The brackets supporting the motor are mounted in such manner on the cross bars, that the crank case of the motor is at one side of the wheel, and very near to it.

The axle 21 of the motor carries a pulley 22, which can come directly into contact with the tire 23 of the wheel.

On the stays 1 are keyed respectively two supporting collars 24 intended to limit the motion of the slides 14 on the said stays 1.

In the cross bars are also mounted the accessories, such as carbureter and magneto.

The operation is as follows: By turning the crank handle 20 the rotation of the shaft 18 is effected, which moves the nut 17 in such manner as to lower or raise the cross bar 15 and the slides 14. The motor unit pivots around the cross bar 10, which itself turns, through a very small angle, around the axle 8. The pulley 22 can therefore be caused to approach or recede at will to or from the pneumatic tire 23.

To put the machine in motion it is only necessary, all the controlling parts being in the desired position, to turn the crank handle 20 in the proper direction to bring the pulley 22 into contact with the tire 23. The motor can then drive the wheel 5.

When it is desired to suspend the action of the motor, it is only necessary to turn the crank handle 20 in the opposite direction to raise the unit, which produces the unclutching.

As will be readily understood, the mounting of the new motor unit on a cycle, and its removal, can be effected without difficulty and in a few minutes. The new system, having neither band nor chain, is exempt from the greater part of the defects of existing motor cycles, and yet insures a very good yield in the transmission of power.

It will be understood that the new unit could be readily modified with a view to permit of its adaptation to the rear wheel.

The above arrangements are given only by way of example; the forms, dimensions and arrangements of detail can be varied in all cases without changing the principle of the invention.

Claims:

1. In a removable motor unit, capable of being fitted rapidly to a cycle, means for attaching a motor unit to a cycle, consisting of a pair of stays clamped to part of the cycle, slides on the said stays to which part of the motor crank case is pivoted, a nut connected to the slides, a longitudinally fixed screwed rod provided with a crank handle and screwing into said nut, and a second pair of stays pivoted at their lower ends to the first mentioned stays and pivoted at their upper ends to part of the motor crank case.

2. In a removable motor unit, capable of being fitted rapidly to a cycle, means for attaching a motor unit to a cycle, consisting of a pair of stays clamped to part of the cycle, slides on the said stays to which part of the motor crank case is pivoted, a nut connected to the slides, a longitudinally fixed screwed rod provided with a crank handle and screwing into said nut, and a second pair of stays pivoted at their lower ends to the first mentioned stays and pivoted at their upper ends to part of the motor crank case, the said first stays being clamped at their upper ends to the handle bar and provided at their lower ends with slotted lugs to be fixed to the axle of the front wheel.

The foregoing specification of my improved motor attachment for cycles, signed by me this twenty-fifth day of May 1914.

RAYMOND GEORGES AIMÉ MAUCLAIRE.

Witnesses:
HANSON C. COXE,
GEORGES CHARLES COQUET.

Copies of this patent may be obtained for five cents each, by addressing the "Commissioner of Patents, Washington, D. C."